April 25, 1933. A. K. FLUELER 1,905,838

CONTROL SYSTEM FOR ELECTRIC MOTORS

Filed April 10, 1929

Inventor
Alfred K. Flueler
By (signature)
Attorney

Patented Apr. 25, 1933

1,905,838

UNITED STATES PATENT OFFICE

ALFRED K. FLUELER, OF COLLINGSWOOD, NEW JERSEY, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

CONTROL SYSTEM FOR ELECTRIC MOTORS

Application filed April 10, 1929. Serial No. 353,939.

This invention relates to improvements in control systems for electric motors.

The present improved system is more particularly adapted for use in electric railway cars such as might be used for suburban service and which are provided with alternating-current series motors.

One of the objects of the present invention is to provide an improved control system of the character referred to wherein the desired number of voltage steps for acceleration of the driving motors is obtained in a simpler and more economical manner than is the case in systems proposed heretofore for this purpose.

Other objects and advantages will hereinafter appear.

Figure 1:
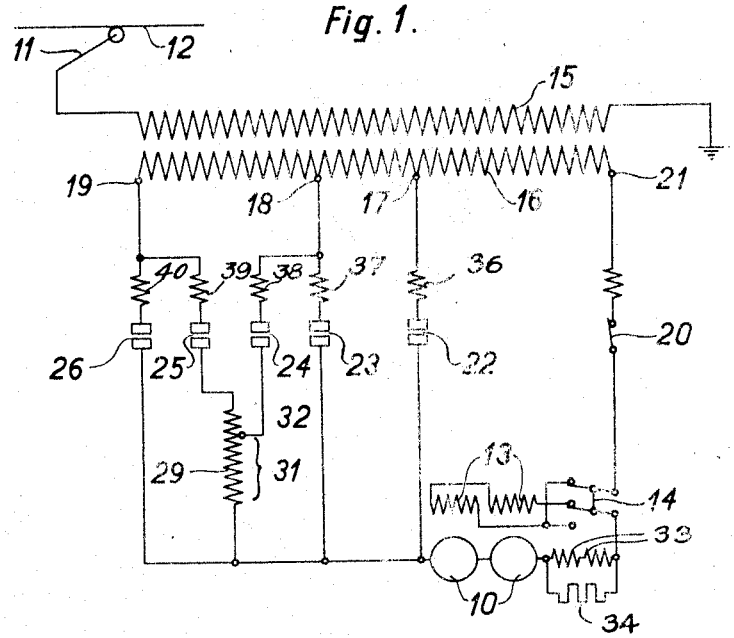
Figure 2:
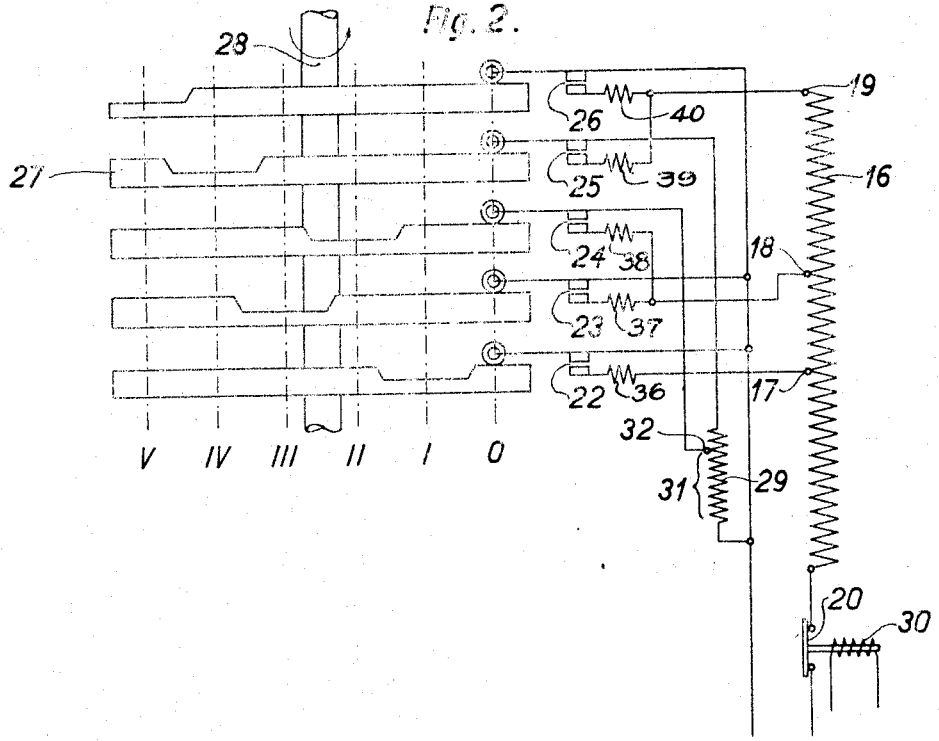

For the purpose of illustrating the invention, one embodiment thereof is shown in the drawing, wherein Figure 1 is a schematic showing of a control system embodying the present improvements;

Fig. 2 is a schematic showing of the actuating means for the control switches.

Referring more particularly to Fig. 1, the reference numeral 10 designates the alternating-current driving motors for an electric car having the trolley or shoe 11 providing an operating connection to the alternating-current supply line or third rail 12. The motors are provided with the series fields 13 which are connected in the supply circuit by the reverser or field-changeover switch 14 and are also provided with interpole windings 33 which are shunted by a resistor 34. The use and purpose of such interpole windings is well understood and the resistor is connected for the purpose of shifting the phase of the current flowing between the windings. The primary 15 of the supply transformer is connected, as shown, between trolley 11 and ground. The secondary winding 16 of the transformer is provided with the first, second and third taps 17, 18 and 19, respectively.

A suitable main switch 20 provides connection between switch 14 and the end-point or tap 21 of the secondary winding. The switches 22, 23, 24, 25 and 26 are operated in the proper sequence by the cams 27 upon rotary movement of the usual control shaft 28 in the direction indicated by the arrow. Each of the switches is provided with a blowout coil 37, 38, 39 and 40 of suitable construction for the purpose of aiding in quenching an arc which might form between the switch contact members. A reactance coil 29 is connected as shown, and operates to provide for application of voltage to the motors at values intermediate the respective voltages between the taps 17 and 18, and between the taps 18 and 19, as will hereinafter more clearly appear.

The operation of the improved control system is as follows:

With cams 27 in position 0, all of the switches will be open and the current to the motors accordingly shut off. When it is desired to start the car, the main switch 20 is closed in any suitable manner, such as by excitation of the operating winding 30, the excitation of which might be controlled by a suitable element or cam (not shown) carried by shaft 28 and arranged to effect excitation of winding 30 upon movement of the cams from position 0 to position I, and to maintain excitation of this winding through the other positions of the cams.

With cams 27 in position I, switch 22 will be closed, and a voltage accordingly applied to the motors substantially equal to the voltage at tap 17 of secondary winding 16.

During movement of the cams from position I to position II, the switch 24 will close before switch 22 opens, so that there will be an intermediate position whereat both of the switches 22 and 24 are closed, at which time the portion 31 of reactance 29 will be connected across taps 17 and 18, the reactance operating to limit to a predetermined value the short-circuit current in the secondary winding between these taps.

The arrangement is such that switch 22 opens just before the cams assume position II, at which time the motors will be connected to tap 18 through portion 31 of reactance 29. Accordingly, a voltage will be applied to the motors equal to a value intermediate the respective voltages at taps 17 and 18, such value depending upon the position of tap 32, the latter being fixed and so placed as to provide the desired intermediate voltage.

During movement of the cams from position II to position III, switch 23 will close before switch 24 opens. As the cams move into position III, switch 24 will open, at which time the motors will be connected, by the closed switch 23, to tap 18 independently of reactance 29, the motors then being supplied with voltage substantially at a value equal to that at tap 18.

During movement of the cams from position III to position IV, switch 25 will close before switch 23 opens, so that at an intermediate point, both of the switches 23 and 25 will be closed, at which time the entire reactance 29 will be connected across taps 18 and 19. The reactance, at this time, operates to limit to a predetermined value the short-circuit current in the transformer winding between taps 18 and 19. Before the cams reach position IV, switch 23 will open, so that in position IV, the motors will be connected to tap 19 through reactance 29, and will be supplied with voltage at a value intermediate the respective voltages at taps 18 and 19, such value depending on the design of the reactance.

During movement of the cams from position IV to position V, and before switch 25 opens, switch 26 will close. When the cams move into position V, switch 25 will open, at which time the motors will be connected through switch 26 to tap 19 independently of reactance 29, the motors then being supplied with voltage substantially equal to the voltage at tap 19.

From the foregoing, it will be seen that in the present embodiment of the invention, five control steps are provided with the use of only the five switches 22, 23, 24, 25 and 26 and the three taps 17, 18 and 19, and that this is made possible by use of only the single reactance 29 and the operating or actuating cams 27 arranged to operate the switches in such manner that in positions II and IV of the cams the motors are connected to certain of the transformer taps through the reactance, while in positions III and V of the cams the motors are connected to certain of the transformer taps independently of the reactance.

In addition to providing the equivalent of supply taps intermediate taps 17 and 18 and intermediate taps 18 and 19, respectively, the reactance 29 also operates to limit the short-circuit current between these taps during the changing-over movement of the switches, as explained.

The present arrangement provides, further, that all of the five cams may be identical in construction, the only difference being in their relative angular positions with respect to each other on shaft 28. Such relative positions are determined by location of the keyways or other means providing for fixation of the cams with respect to the shaft. This possibility provides for a simpler and cheaper construction than has been possible heretofore and facilitates assembly of the parts.

While but one embodiment of the invention has been shown and described, it will be understood that various changes might be made without departing from the spirit of the invention or the scope of the claims.

The invention claimed is:

1. In a control system, the combination with a source of alternating current, a transformer connected with said source and provided with a plurality of voltage-stage taps, a multi-tapped impedance device, and a motor, of a controller comprising a plurality of switches arranged to sequentially effect connection of the said voltage-stage taps with the said motor, the said controller including switches to effect connection of a portion only of said device in circuit between certain of said voltage-stage taps and the said motor, and including switches for effecting connection of the whole of said device in circuit with certain other of said voltage-stage taps and the said motor to vary the impedance of the motor circuit.

2. In a control system, the combination with a source of alternating current, a transformer connected with said source and provided within $n$ number of voltage-stage taps, a multi-tapped reactance device, and a motor, of a controller comprising $n+2$ switches for establishing connections between the said voltage-stage taps and the said motor to effect $n+2$ voltage variation step connections between the said transformer and the said motor without interruption of current flow to said motor, the said device being effective to limit the flow of current by way of certain of said voltage-stage taps when connected with said motor by way of certain of said switches.

3. In a control system, the combination with a source of alternating current, a transformer connected with said source and provided with $n$ number of voltage-stage taps, a multi-tapped reactance device, and a motor, of a controller comprising $n+2$ switches for establishing $n+2$ connections of the said motor with the said voltage-stage taps without interruption of current to the said motor, certain of said switches being arranged to include a portion only of the said device in certain of the said connections, and certain other of the said switches being arranged to include the whole of said device in certain other of the said connections.

4. In a control system, the combination with a source of alternating current, a transformer connected with said source and provided with $n$ number of voltage-stage taps, a multi-tapped reactance device, and a motor, of a controller comprising $n+2$ switches for establishing $n+2$ voltage-variation step connections of the said motor with the said voltage-stage taps without interruption of flow to the said motor, certain of said switches being arranged to include a portion only of said device in certain of said connections, certain other of said switches being arranged to include the whole of said device in certain other of said connections, and the remainder of the said switches being arranged to establish certain of the said connections to the exclusion of the said device.

5. In a control system, the combination with a source of alternating current, a transformer winding connected with said source and provided with a plurality of voltage-stage taps, a multi-tapped reactance device, and a motor, of a controller comprising a plurality of switches arranged to establish sequentially connections of said voltage-stage taps with the said motor without interruption of flow of current to the said motor, certain of said switches being arranged to establish connection of a portion only of said device between certain of said voltage-stage taps and the said motor and a certain another of said voltage-stage taps, and certain other of said switches being arranged to establish connection of the whole of said device between certain of said voltage-stage taps and the said motor and between last said voltage-stage tap and another of the said voltage-stage taps, the said connections of the said device operating to prevent short circuit of the portions of said winding between the connected voltage-stage taps.

In witness whereof, I hereto affix my signature this 4th day of April, A. D. 1929.

ALFRED K. FLUELER.